Nov. 28, 1961 R. F. GRAY 3,010,109
FLUID FILLED GOGGLES
Filed Jan. 28, 1959 2 Sheets-Sheet 1
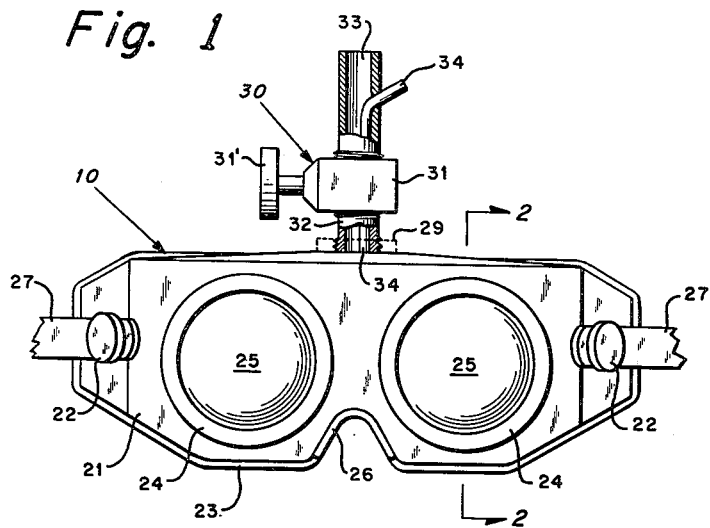
Fig. 1
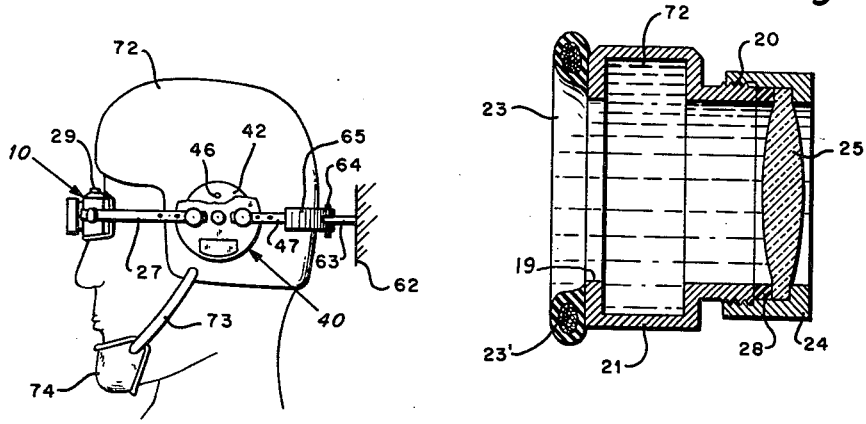
Fig. 9
Fig. 2
INVENTOR.
REUBEN FLANAGAN GRAY
BY
ATTORNEYS Nov. 28, 1961    R. F. GRAY    3,010,109
FLUID FILLED GOGGLES
Filed Jan. 28, 1959    2 Sheets-Sheet 2

INVENTOR.
REUBEN FLANAGAN GRAY

BY

*F. M. Smith Jr.*
ATTORNEYS

United States Patent Office 3,010,109
Patented Nov. 28, 1961

3,010,109
FLUID FILLED GOGGLES
Reuben Flanagan Gray, Levittown, Pa., assignor to the United States of America as represented by the Secretary of the Navy
Filed Jan. 28, 1959, Ser. No. 789,754
14 Claims. (Cl. 2—14)
(Granted under Title 35, U.S. Code (1952), sec. 266)

The invention described herein may be manufactured and used by or for the Government of the United States of America for governmental purposes without the payment of any royalties thereon or therefor.

The present invention relates to fluid filled goggles, and more particularly, to fluid filled goggles operable to provide protection of the eyes from the adverse effects of acceleration or deceleration forces.

Prior art devices fail to provide for adequate protection of the eyes when the imposed G stresses are relatively large, such as those encountered during the extreme acceleration or deceleration of an acceleration sled, human centrifuge, or other type of acceleration machine. A subject undergoing human tolerance tests to effects of G forces in such a vehicle must frequently be positioned such that the G force lies substantially along the line of vision and in a direction tending to project or pull the eyes from their sockets, away from the face. If the G force encountered is extreme, blood is forced to the region of the eyes, impairing vision and causing possible rupture of the blood vessels. The instant invention prevents this condition from occurring and insures positive eye protection from effects of G forces, obviating in this respect the limitations of prior art devices.

As will be hereinafter set forth with greater particularity, the instant invention embraces a novel goggles means filled preferably with an isotonic fluid for restraining excursion or displacement of the eyes during periods of high G stresses. In addition, to overcome the tendency of the goggles to move away from the wearer's face as a function of an applied G force, means are incorporated to counteract such tendency.

An object of the present invention is to provide goggles suitable for use during periods of extreme acceleration or deceleration.

Another object is to provide goggles for restraining excursion or displacement of the eyes during periods of extreme acceleration or deceleration.

A further object is the provision of liquid filled goggles with refractive lenses for protection and comfort of the eyes during periods of extreme acceleration or deceleration.

An additional object of the present invention is the provision of a novel tightening means operable as a function of a G force for securely maintaining the goggles about the wearer's head.

Additional objects and advantages will become more fully apparent upon examination of the annexed description and attached drawings, wherein:

FIG. 1 is a front elevational view of a preferred embodiment of fluid filled goggles of the instant invention, FIG. 2 is a sectional view taken on line 2—2 of the device of FIG. 1.

FIG. 9 is a side elevational view of the preferred embodiments of the fluid filled goggles and tightening means of the instant invention incorporating a helmet.

Figure 4:
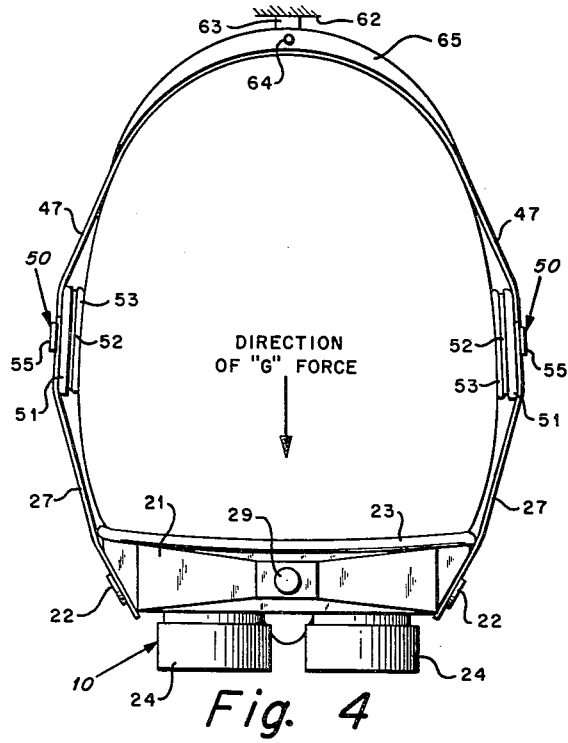
FIG. 4 is a top view of the preferred embodiment of the inventive fluid filled goggles additionally incorporating a novel tightening means, illustrating application of this combination of elements in a restrained position relative to a G force applied in the direction indicated.

Referring now to the drawings, wherein like reference numerals designate like or corresponding parts throughout the several views, there is shown in FIG. 1 the fluid filled goggles of the instant invention generally designated by numeral 10. A portion of the goggles housing 21, forming the apertures 19, is shown in the cross-sectional view of FIG. 2 to contain screw threads 20 for receiving lens retainer 24. Tightening of the threaded portions causes refractive lens 25 to abut the inner flanged portion of retainer 24, while an annular sealing ring 28 provides a liquid-tight seal between housing 21 and lens 25. In applications in which visibility is not a requirement, the provision of aperture means, of course, may be omitted entirely. Resilient sealing means 23, such as rubber or vinyl, covering the core 23' of foam rubber, or the like, is secured by any suitable means to the outer periphery or rim of the housing 21. Straps 27 are shown in FIG. 1 attached to the opposite ends of housing 21 by conventional fastening means, such as bolts 22, each of which passes through a hole in a strap 27 and threads into the housing 21. Strap 27 may be any flexible material such as spring steel, leather, or the like.

The liquid inlet means, including the provision of bleeder means for bleeding off entrapped air from the interior space of the goggles, is generally designated by the numeral 30 in the view of FIG. 1. Valve 31 is of a type preferably having two separate openings, not shown, which are concentrically aligned with tubes 33 and 34 in the open position of the valve. Tube 34 is attached to the inner wall of pipe 32, as by soldering. Pipe 32 is threadably engaged with housing 21. Valve 31 is joined to pipe 32 by a threadable engagement, as illustrated, or any other conventional means. Separate valves may be provided, of course, for independent control of the liquid supply and bleeder functions.

With the goggles device firmly supported against the subject's head to provide a water-tight closure, the filling and bleeding process is initiated by rotation of knob 31'. An incompressible transparent liquid 72 preferably of isotonic character is allowed to enter under gravity flow through inlet 33 into the interior of housing 21. In practice, water in distilled or undistilled form is an excellent medium. As the flow of liquid enters the interior space of the goggles, ambient air within the goggles is ejected through the bleeder tube 34. When all of the entrapped air is expelled, as evidenced by a continuous efflux of the liquid medium from tube 34, valve 31 is closed by rotation of handle 31', shutting off both the liquid supply and the bleeder tube. Due to the incompressible nature of the liquid, which completely surrounds the region of the eyes in a closed constant volume relationship, the liquid functions as a buffer to prevent displacement of the eyeballs during the periods of high G stress, thus providing support for the eyes. The refractive distortion effect of the liquid upon the eye is compensated by lens 25 to assure clear visibility therethrough. If desired, the liquid inlet and bleeder means may be removed from housing 21, after filling, and be replaced by plug 29 shown in phantom in FIG. 1. This expedient lessens the mass of the goggles subject to G stress.

Figure 3:
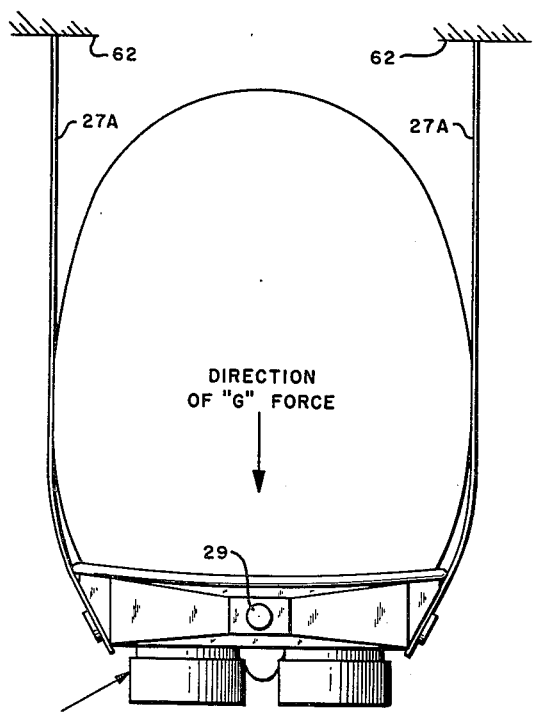
FIG. 3 is a top view of the preferred embodiment of the inventive fluid filled goggles showing application thereof in a restrained position relative to a G force applied in the direction indicated.

FIG. 3 illustrates application of the goggles device 20 in a restrained position relative to a G force applied in the direction indicated. The direction of the G force is typical of that occurring upon deceleration of forward motion, or that exerted upon a subject in a human centrifuge in the form of a sustained, radial G force. In FIG. 3, the inherent mass of the subject's head moving in the direction of the applied G force, as indicated, along with any steady state force the subject is able to effect by bracing, are used to maintain pressure upon the goggles for securing sealing. The strap extremities 27A, in this instance, are fixedly attached to the vehicle frame 62. In this manner, the integrity of the seal between the goggles and the subject's face is maintained.

Figure 7:
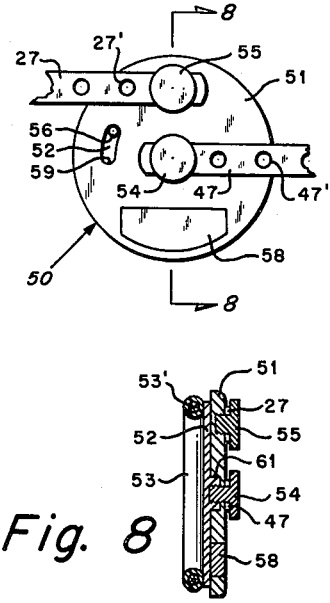
FIG. 7 is an elevational view of an alternate G responsive tightening means.
Figure 8:
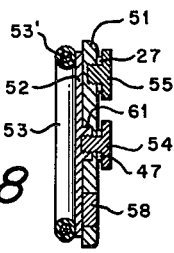
FIG. 8 is a sectional view taken along line 8—8 of the means of FIG. 7.

FIG. 4 depicts the inventive fluid filled goggles embodying the novel tightening means shown in the views of FIGS. 7 and 8, and illustrates application of the combinative means in a restrained position relative to an applied G force in the direction indicated. The novel tightening means will be discussed next below. The goggles in this instance are snugly maintained about the head by strap member 27 and a flexible stretch resistant band or web 47, the extremities of which are fastened to the tightening means generally depicted by numeral 50 and illustrated in greater detail in FIGS. 7 and 8. Both strap members 27 are connected at one of their extremities to the goggle housing 21, as before, and at their other extremities to a tightening means 50. A substantially rigid member 65 is attached to band 47 and is loosely connected with pin 64 to the fixed projection 63 of the vehicle frame 62, thus providing the requisite restraint for the subject during deceleration of forward motion or acceleration of backward motion. The resilient cushions 53 are supplied to provide comfort for the subject in the regions of the auricles. It should be noted that operational circumstances may dictate the use of fluid filled ear muffs, which are the subject matter of an invention described in application Serial No. 789,755 of Reuben Flanagan Gray for Fluid Filled Ear Muffs, filed January 28, 1959, now Patent No. 2,955,086. Hence, if desired, the fluid filled ear muffs therein described may be integrated with the fluid filled goggles of the instant invention.

Figure 5:
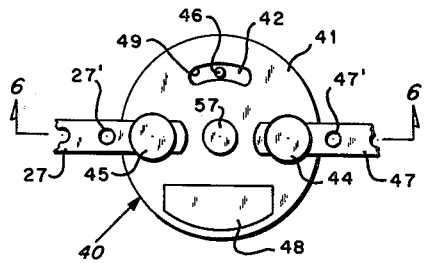
FIG. 5 is an elevation view of a preferred G responsive tightening means.
Figure 6:
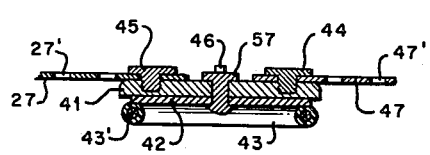
FIG. 6 is a sectional view taken along line 6—6 of the means of FIG. 5.

The preferred embodiment of the tightening means of the instant invention is illustrated in FIGS. 5 and 6, and in the profile view of FIG. 9. The degree of tightening provided by these tightening means supplements that supplied by the restraint obtained from vehicular frame 62. By these means, positive water-tight sealing of the goggles is insured. With respect to FIG. 5, tightening means 40 comprises weight member 48, preferably a high density material such as lead, which is securely fastened to disc 41 by any suitable known means, such as rivets or the like, not shown. Pin 46 is attached to the stationary disc 42 and protrudes through an arcuate slot 49 to provide tightening action over a range limited by the arbitrary length of the arcuate slot. Member 41 is pivotable about stud 57, which is attached to disc 42. Straps 27 and 47 are disposed for pivotable movement about studs 45 and 44, respectively, which are threadably engaged or otherwise fixedly secured to disc 41. Resilient cushion 43 may be entirely formed of a foam rubber composition or be constructed similarly to the sealing means utilized for the goggles. Apertures 27' in strap 27 and 47' in strap 47 provide for initial fitting adjustments. Of course, other adjustment expedients known in the art may be employed.

An alternative embodiment for providing a G responsive strap tightening means is shown in FIGS. 7 and 8. In the arrangement generally designated by numeral 50, the torque contributing to tightening is the differential moment resulting by summing the moment of weight 58 and the combined goggles and fluid proper about stud 54, acting as a fulcrum. Hence, in this embodiment, the mass of member 58 must not be less than the combined mass of the goggles and fluid, if tightening is to be obtained upon deceleration of forward motion. Resilient cushion 53 is attached by suitable means, as in the previous instance, to fixed disc 52. Each strap 27 is fixedly attached to goggle housing 21 at one extremity and pivotally connected to a disc 51 by means of bolt 55 at its other extremity, diametrically opposing weight 48, as shown in FIG. 7. Strap 47 is pivotally attached to each disc 51 by a bolt or stud 54. Other constructional details are similar to those described for the embodiment shown in FIGS. 5 and 6.

It should be noted that in the embodiments illustrated in either FIGS. 5 and 6, or FIGS. 7 and 8, the backplate or disc 42 including the associated cushioning means 43, and the disc 52 including its associated cushioning means 53, respectively, are understood to be relatively immobilized with respect to the head of the subject. While the cushioning means contiguous with each of the auricles is sufficient, in general, to provide for the aforementioned immobility, the disc members 42 or 52, of course, may be fixedly attached to a helmet, as shown in FIG. 9. In addition, the use of a helmet, having rigid characteristics, aids to provide a uniform distribution of pressure on the head of the subject. Hence, the use of such helmet greatly mitigates any tendency for contortion effects upon the subject's head.

As mentioned previously, the device of FIG. 3 is dependent upon the mass of the subject's head under G stress plus any other pressure exerted by the subject to effect a proper seal about the periphery of the goggles 10. Since a subject's head is inherently more massive than the combined mass for the goggles and fluid, the force applied the goggles during deceleration of forward motion encourages the integrity of the sealing in the inventive device.

Referring to FIG. 4, goggle assembly 10 is maintained secure to the subject's head during deceleration of forward motion by the restraining force supplied from vehicle frame 62, in addition to the pressure of strap tightening means 50 portrayed in FIGS. 7 and 8. If desired, the alternate strap tightening device 40 may be substituted for device 50.

FIG. 9 portrays in a profile view, the preferred embodiments of the fluid filled goggles and the tightening means of the instant invention, incorporating the feature of a helmet. Disc 42 is fixedly attached by suitable conventional means, such as rivets, not shown, to helmet 72, which is of a rigid characteristic. Hence, disc 42 is immobile relative to the helmet 72 or the head of the subject. The cushioning means for the auricles in this instance may be contained on the inside of the helmet.

A chin strap 73 and chin guard 74 provide for securing the helmet to the subject. The inner surface of band 47 is in substantial common contact with helmet 72. The provision for restraint is the same as in FIG. 4.

Referring now to FIG. 5, tightening of the goggles about the head of the subject is achieved in this particular embodiment as a function of either acceleration or deceleration. The force contributing to the tightening action derives from the moment of the mass of member 48 about pivot 57 during periods in which a rate of change in velocity occurs. Hence, disc 41 will tend to rotate about pivot 57 due to the effect of the aforementioned moment, thereby providing tightening action. Rotation of disc 41 is restricted arbitrarily within the angular limits permitted by pin 46 abutting either extremity of the arcuate slot 49.

The alternative tightening means 50 shown in front elevation in FIG. 7 performs a tightening function with respect to a G force applied from right to left, as would occur in deceleration of forward motion. In this instance, the force contributing to unidirectional tightening action is proportional to the difference of the moments between that of the mass of member 58 and the combined mass of the goggles and fluid proper taken about bolt 54, during periods in which the device of the instant invention is undergoing deceleration of motion in the forward direction. As viewed in FIG. 7, disc 51 tends to rotate clockwise about bolt 54, as a result of this differential moment, causing tightening of straps 27 and 47. Arcuate slot 49 cooperating with pin 46 which itself is attached to disc 42 acts to limit the amount of tightening, as before.

Hence, the device 50 of FIG. 7 is particularly useful when the applied G stress is unidirectional, from right to left as noted, whereas the device 40 as shown in FIG. 5, may be effectively employed when the applied G stress is bi-directional in character, i.e., the G force occurs in consecutively opposed directions, as in abrupt acceleration followed by abrupt deceleration of the subject's environment, or vice versa.

Thus, it has been shown that the inventive liquid filled goggles when worn by a subject provide positive protection for the eyes from effects of G forces. Because of the incompressible nature of the liquid medium contained within the goggles in a constant volume relationship, the projection of the eyeballs under the influence of a G force is precluded. Moreover, the G responsive tightening means of the instant invention supplements the tightening action supplied from a fixed restraint so that the sealing integrity of the liquid filled goggles is positively maintained.

Obviously, many modifications and variations of the present invention are possible in the light of the above teachings. It is therefore to be understood that, within the scope of the appended claims, the invention may be practiced otherwise than as specifically described.

What is claimed is:

1. A goggles device of the type described adapted to hold a liquid medium, comprising a housing member including a periphery shaped generally to fit the contour of a portion of the face embracing the eyes of a subject and forming a pair of apertures for visual access therethrough, resilient sealing means attached to the periphery of the housing member contiguous with the face, an optical lens for each of said apertures having at least one of its opposite surfaces curved to compensate for refractive distortion caused by the liquid medium upon said lens and the eye, and means connecting opposite ends of the housing member for securing said goggles device tightly over the eyes.

2. A goggles device of the type described adapted to hold a liquid medium, comprising a housing member including a periphery shaped generally to fit the contour of a portion of the face embracing the eyes of a subject and forming an aperture for visual access therethrough, resilient sealing means attached to the periphery of the housing member contiguous with the face, an optical lens for said aperture having at least one of its opposite surfaces curved to compensate for refractive distortion caused by the liquid medium upon said lens and the eye, inlet means mounted on said housing member for admitting a liquid medium, and means connecting opposite ends of the housing member for securing said goggles device tightly over the eyes.

3. A goggles device of the type described adapted to hold a liquid medium, comprising a housing member including a periphery shaped generally to fit the contour of a portion of the face embracing the eyes and forming an aperture for visual access therethrough, resilient sealing means attached to the periphery of the housing member contiguous with the face, optical lens means for said aperture, means connecting opposite ends of the housing member for securing said goggles device tightly over the eyes, inlet and bleeder means including a single valve means for controlling the flow of a liquid medium and expelling entrapped air from the interior of said goggles device.

4. A head gear of the type described adapted to hold a liquid medium, comprising a housing member including a periphery shaped generally to fit the contour of a portion of the face embracing the eyes of a subject, resilient sealing means attached to the periphery of the housing member contiguous with the face, pivotal means disposed for angular displacement proportional to the rate of change of velocity, and means connecting opposite ends of the housing member and interconnected through said pivotal means to operably provide a tightening level proportional to said angular displacement.

5. A goggles device of the type described adapted to hold a fluid medium, comprising a housing member including a periphery shaped generally to fit the contour of a portion of the face embracing the eyes of a subject and forming an aperture for visual access therethrough, resilient sealing means attached to the periphery of the housing member contiguous with the face, optical lens means for said aperture, pivotally mounted means disposed for angular displacement proportional to rate of change of velocity, and means connecting opposite ends of the housing member and operably interconnected with said pivotally mounted means to provide a tightening level proportional to said angular displacement.

6. A goggles device of the type described adapted to hold a fluid medium, comprising a housing member including a periphery shaped generally to fit the contour of a portion of the face embracing the eyes of a subject and forming a pair of apertures for visual access therethrough, resilient sealing means attached to the periphery of the housing member contiguous with the face, optical lens means for said apertures, pivotally mounted means disposed for angular displacement proportional to rate of change of velocity, means connecting opposite ends of the housing member and operably interconnected with said pivotally mounted means to provide a tightening level proportional to said angular displacement, and inlet means mounted on said housing member for admitting a fluid medium to the interior of said goggles device.

7. A goggles device of the type described adapted to hold a fluid medium, comprising, in combination, a housing member including a periphery shaped generally to fit the contour of a portion of the face embracing the eyes of a subject and forming an aperture for visual access therethrough, resilient sealing means attached to the periphery of the housing member contiguous with the face, optical lens means for said aperture, a stud having a fixed position, an element mounted adjacent on a common axis with the stud and disposed for limited rotation about said common axis, a high density mass fixedly positioned on said element at a predetermined radial distance from said common axis, and strap means operably connected with the element to provide a tightening level proportional to said limited rotation, whereby the angular displacement operable to provide tightening is a function of the rate of change of velocity acting upon the means having a high density mass.

8. In a head gear, a G responsive tightening device comprising, a stud attached in fixed position to the head gear, an element mounted adjacent on a common axis with the stud and disposed for limited rotation about said common axis, a mass having a high density fixedly positioned on said element at a predetermined radial distance from said common axis, and a strap means operably connected with the element to provide a tightening level proportional to said limited rotation, whereby the angular displacement operable to provide tightening is a function of the rate of change of velocity acting upon the high density mass.

9. The head gear of claim 8 in which the strap means includes extremities, said extremities being respectively operably connected to opposed connection points symmetrically located with respect to and in the plane of the common axis on said element.

10. The head gear of claim 8 in which the strap means includes extremities, said extremities being respectively operably connected to opposed connection points colinear with said common axis and the center of the high density mass on said element.

11. A goggles device of the type described adapted to hold a fluid medium, comprising, in combination, a housing member including a periphery shaped generally to fit the contour of a portion of the face embracing the eyes of a subject and forming an aperture for visual access therethrough, resilient sealing means attached to the periphery of the housing member contiguous with the face, optical lens means for said aperture, and tightening means connecting opposite ends of the housing member including a strap and an element, the strap having at least one end pivotally connected intermediate the ends of the element, one end of the element pivotally connected to the housing member, and a high density mass attached to the other end of the element whereby the element is angularly displaced in accordance with acceleration.

12. A goggle device as defined in claim 11 and including means for limiting the angular displacement of the element.

13. A goggle device of the type described adapted to hold a fluid medium, comprising, in combination, a housing member including a periphery shaped generally to fit the contour of a portion of the face embracing the eyes of a subject and forming an aperture for visual access therethrough, resilient sealing means attached to the periphery of the housing member contiguous with the face, optical lens means for said aperture, and tightening means connecting opposite ends of the housing member including a strap and an element, the strap having at least one end pivotally connected to one end of the element, the other end of the element pivotally connected to the housing member, a stud means fixed to the subject and pivotally connected to the element intermediate of its ends, a high density mass connected to the element and radially displaced from the stud, whereby the element is angularly displaced in accordance with acceleration.

14. A goggle device as defined in claim 13 and including means for limiting the angular displacement of the element.

References Cited in the file of this patent

UNITED STATES PATENTS

| | | |
|---|---|---|
| 2,143,856 | Biggs | Jan. 17, 1939 |
| 2,182,104 | Wilen et al. | Dec. 5, 1939 |
| 2,488,235 | Pfeiffer | Nov. 15, 1949 |

FOREIGN PATENTS

| | | |
|---|---|---|
| 1,046,371 | France | July 8, 1953 |